United States Patent
Polinsky et al.

(10) Patent No.: US 6,381,051 B1
(45) Date of Patent: Apr. 30, 2002

(54) SWITCH EMPLOYING PARTIALLY REFLECTIVE COATING

(75) Inventors: David Polinsky, San Francisco; Roe Hemenway, Lafayette; Ho-Shang Lee, El Sobrante, all of CA (US)

(73) Assignee: Dicon Fiberoptics, Inc., Berkeley, CA (US)

( * ) Notice: Subject to any disclaimer, the term of this patent is extended or adjusted under 35 U.S.C. 154(b) by 0 days.

(21) Appl. No.: 09/146,728

(22) Filed: Sep. 3, 1998

(51) Int. Cl.[7] .................................................. H04J 14/02
(52) U.S. Cl. ........................ 359/128; 359/117; 359/127; 359/139; 359/159; 359/589
(58) Field of Search ................................. 359/127, 128, 359/139, 117, 589, 159

(56) References Cited

U.S. PATENT DOCUMENTS

| | | | |
|---|---|---|---|
| 4,322,126 A | * 3/1982 | Monowa et al. ........... 350/96.2 |
| 4,896,935 A | 1/1990 | Lee | |
| 5,317,659 A | 5/1994 | Lee | |
| 5,420,946 A | * 5/1995 | Tsai ............................. 385/22 |
| 5,652,814 A | * 7/1997 | Pan et al. ..................... 385/24 |
| 5,664,034 A | * 9/1997 | Mock ........................... 385/16 |
| 5,737,104 A | * 4/1998 | Lee et al. ................... 359/124 |
| 5,786,915 A | * 7/1998 | Scobey ....................... 359/127 |
| 5,815,614 A | * 9/1998 | Pan ............................. 385/22 |
| 6,008,920 A | * 12/1999 | Hendrix ...................... 359/127 |
| 6,084,994 A | * 7/2000 | Li et al. ....................... 385/31 |
| 6,125,221 A | * 9/2000 | Bergmann et al. ............ 385/33 |

* cited by examiner

Primary Examiner—Leslie Pascal
Assistant Examiner—Hanh Phan
(74) Attorney, Agent, or Firm—Peter G. Mikhail; Skjerven Morrill MacPherson LLP

(57) ABSTRACT

A distributed matrix switch comprises a number of collimators each comprising a ferrule and a GRIN lens. A partially reflective coating is provided at the GRIN lens surface to pass a portion of an incoming light beam and to reflect the remainder. If the reflected portion is conveyed by means of an optical path to another collimators of similar construction, selected percentages of an incoming beam may be distributed along two or more optical paths. A receiving channel is then moved to different positions for receiving the portion of the light that is passed by one of the collimators to accomplish switching.

22 Claims, 4 Drawing Sheets

US 6,381,051 B1

SWITCH EMPLOYING PARTIALLY REFLECTIVE COATING

BACKGROUND OF THE INVENTION

This invention relates in general to switches for switching one or more channels of radiation and in particular to a switch employing a coating partially reflective of radiation.

A prior art distributed matrix switch is shown in FIG. 1. A distributed matrix switch allows one of many output ports to pick up signals out of any one of the input ports. This type of signal routing device is widely used in fiber optic networks for configuring the optical signal distribution. A matrix switch of size 4×4 is selected in FIG. 1 for illustration. 101–104 are four 1×4 optical splitters used to equally or unevenly split the input power to four channels, e.g. 131(1)–134(1) of splitter 101. Each of the four channels of each splitter is grouped together with a corresponding channel of each of the remaining three splitters to form four groups of four output channels each. For example, channels 131(1), 131(2), 131(3), 131(4) are grouped together to form a group. The four channels of each group are respectively optically connected to four inputs of a switch, such as switch 111, so that the four outputs of all four splitters are connected to all four switches 111, 112, 113, 114. Therefore, the signal of the input ports I-1 to I-4 can reach any switch.

The prior art switch shown in FIG. 1 is disadvantageous since splitters are just as expensive as optical switches. Having to employ a large number of splitters to form a distributed matrix switch adds to the costs and increases the integration complexity and size. It is therefore desirable to provide an improved switch which is simpler and less expensive than the matrix switch of FIG. 1 described above.

SUMMARY OF THE INVENTION

This invention is based on the recognition that the above-described conventional matrix switch can be simplified by employing a partially reflective coating or wavelength selective filter which permits the splitting function to be incorporated into the switch as well, thereby significantly reducing the cost and the packaging size. One or more optical components may be used, where each component includes an optical coating or wavelength selective filter that partially reflects and partially passes different portions of an input radiation beam. By causing a receiving channel to receive a portion of a selected beam passed by a component by means of the optical coating or filter of that component, a switching function is performed.

One embodiment of the invention is in a form of a switch comprising a plurality of optical components, each component including an optical coating that reflects a first portion of an input beam of radiation and passes a second portion of the input beam; and receiving means including a receiving channel for receiving the second portion of an input beam passed by a selected component of the plurality of components.

Another embodiment of the invention is a distributed matrix switch comprising n sets of optical components, each set including m components, n, m being positive integers, each component including an optical coating that reflects a first portion of a corresponding input beam of radiation and passes a second portion of the input beam; n groups of optical paths, each group including (m−1) paths for connecting the m components of a corresponding set of components, each path connecting the ith component to the (i+1)th component in the corresponding set, i ranging from 1 to (m−1), so that radiation passed by the ith component becomes the input beam to the (i+1)th component; and receiving means including m receiving channels, each channel for receiving the second portion of an input beam passed by one of the components in the n sets of components; said receiving means including means for causing each of the in receiving channels to receive the second portion of the input beam passed by a selected one of the plurality of components.

BRIEF DESCRIPTION OF THE DRAWINGS

For simplicity in description, identical components are identified by the same numerals in this application.

DETAILED DESCRIPTION OF THE PREFERRED EMBODIMENT

Figure 1:
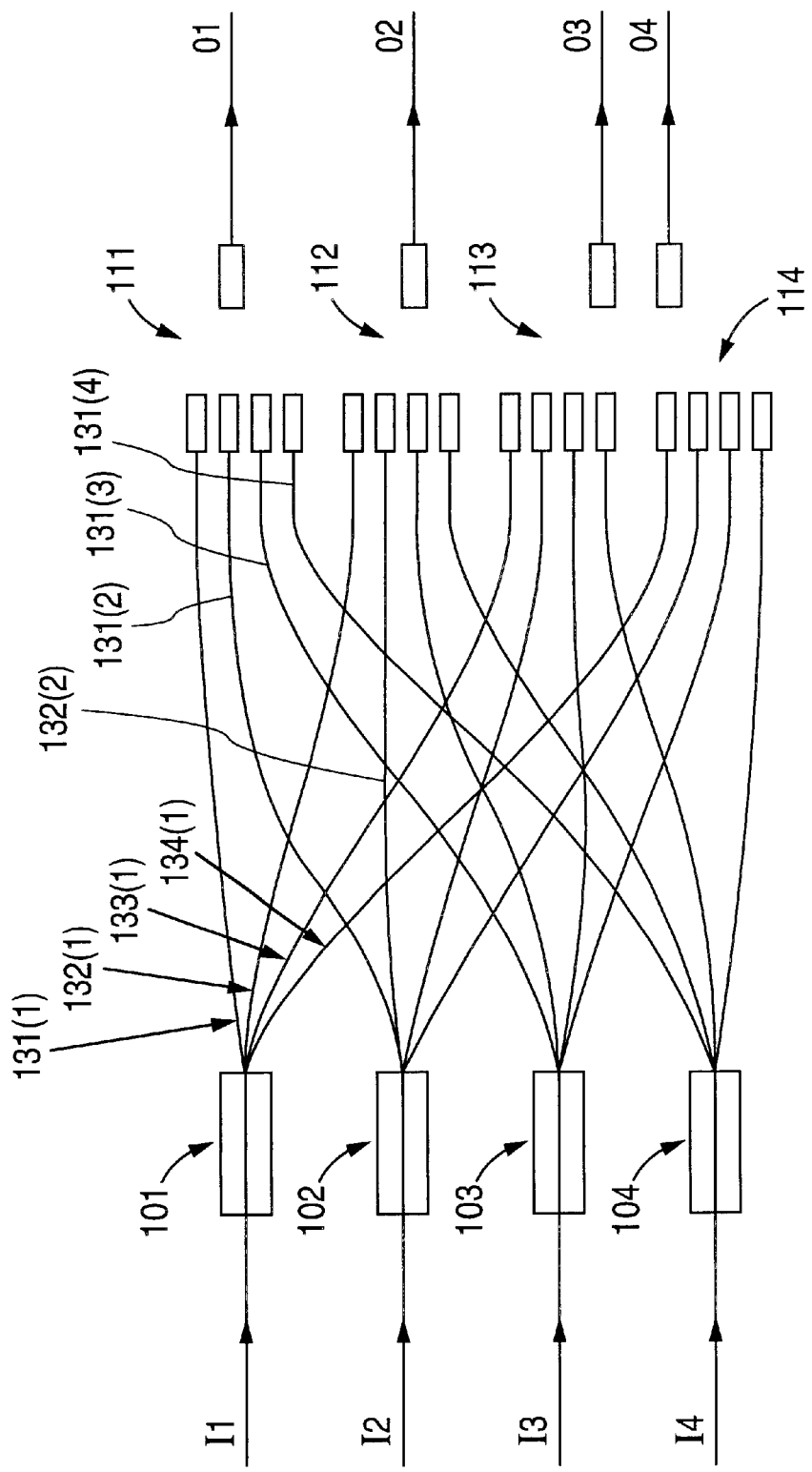
FIG. 1 is a schematic view of a conventional distributed matrix switch.
Figure 2A:
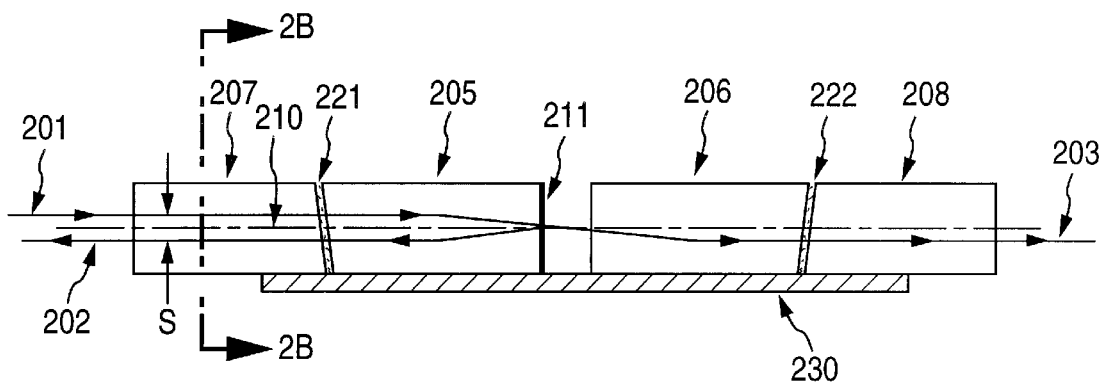
FIG. 2A is a cross-sectional view of an optical channel employing a partially reflective coating useful for illustrating the invention.
Figure 2B:
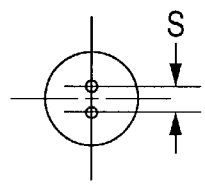
FIG. 2B is a cross-sectional view of the optical channel of FIG. 2A along the line 2B—2B in FIG. 2A.

FIG. 2A is used to illustrate the optical tapping mechanism from an optical channel. Optic fibers 201 and 202 are embedded in a ferrule 207 whose cross sectional view along the line 2B—2B is shown in FIG. 2B. Two fibers 201 and 202 are separated with a prescribed distance S. A coating 211 is applied to the surface of a Gradient Index ("GRIN") lens 205. Coating 211 may be a radiation reflective coating or a wavelength selective filter, such as a bandpass or edge filter. The reflectivity of the coating is controlled by the coating structure. Where the coating 211 is a wavelength selective filter, as explained in detail in U.S. Pat. No. 5,737,104, the pass band of the coating 211 depends also upon the value of angle of incidence of the input beam at the coating and can be adjusted by adjusting the distance S to pass and reflect radiation of the desired wavelengths. U.S. Pat. No. 5,737,104 is incorporated herein in its entirety.

Active optical alignment between the ferrule 207 and GRIN lens 205 is executed to achieve optimal optical coupling between the fiber 201 and fiber 202. Once the optimal coupling is found, either the Ferrule 207 is bonded to the GRIN lens 205 by an adhesive layer 221 or both ferrule 207 and GRIN lens 205 are mounted together to a substrate 230.

206 is another GRIN lens used to collimate or otherwise efficiently couple the transmitted power through GRIN lens 205 to the receiving fiber 203. The fiber 203 is embedded to a ferrule 208, which is either bonded by an adhesive layer 222 to the GRIN lens 206 or mounted onto substrate 230 together with the lens 206, as the optimal coupling between the GRIN lens 206 and ferrule 208 is achieved. As shown in FIG. 2A, the beam of radiation carried by the input fiber 201 is at a certain distance (½ of S) to axis 210 of the GRIN lens 205, so that the input beam of radiation is incident onto the coating 211 at an angle away from the normal direction 210 to the coating, so that a portion of the input beam is transmitted through lens 205 towards lens 206 and a portion of the input beam is reflected towards output fiber 202. The portion of the input beam that is transmitted through the coating is collimated by GRIN lens 206 and directed towards the receiving fiber 203 as shown in FIG. 2A. The above-described property of the coating 211 may then be used to construct a switch as illustrated in FIG. 3.

Figure 3A:
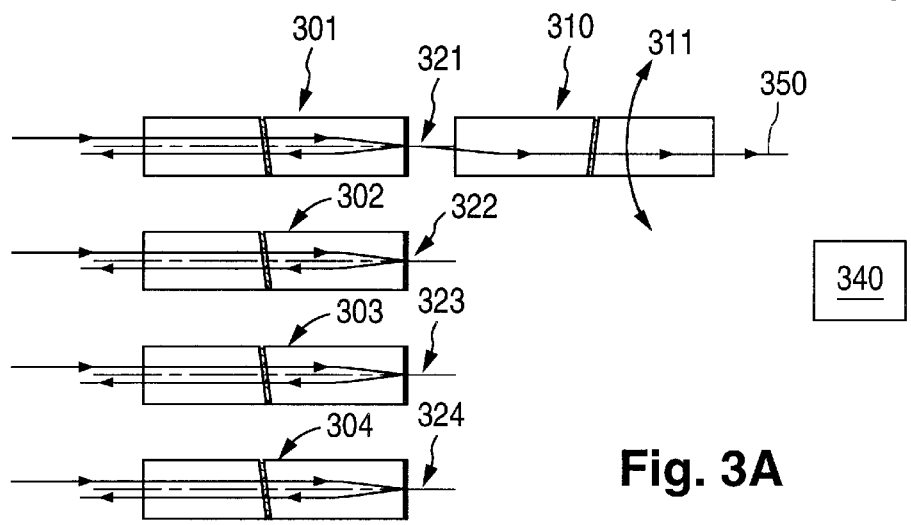
FIG. 3A is a cross-sectional view of an optical switch with four input channels each employing a partially reflective coating and a single output channel that is adapted to receive the radiation passed by any one of the four input channels to illustrate an embodiment of the invention.

FIG. 3A is used to depict the concept of optical switching. Some concrete examples of switches are given in U.S. Pat. Nos. 4,896,935 and 5,317,659 by Ho-Shang Lee. By means of a moving mechanism such as a motor 340 (that causes rotation or linear displacement) as described in the two patents, a common collimator 310 is moved in the direction indicated by a double arrow 311 in order to select radiation signal one at a time from any of input collimators 301, 302, 303 and 304. The signal of each input collimator is separated by applied coating as indicated by 321, 322, 323, 324, respectively, on the surface of each of four input GRIN lens. Each of the four input collimators 301–304 and the two optical fibers associated with it may have the same construction as ferrule 207, GRIN lens 205 and fibers 201, 202 of FIG. 2A. The input beams along the input fibers in the four collimators are incident on their respective coatings 321–324 at selected angles, thereby causing a portion of each of such input beam to pass the coating and the remainder of the input beam to be reflected towards an output optical fiber. By moving the common collimator 310 along arrow 311, the radiation passed by one of the four input collimators 301–304 is focused by the common collimator 310 onto a receiving optical fiber 350 embedded in the ferrule of the receiving channel. In the configuration in FIG. 3A, the common collimator 310 is in a position to receive the radiation that is passed by collimator 301 and it passes such radiation to the receiving fiber 350.

Figure 3B:
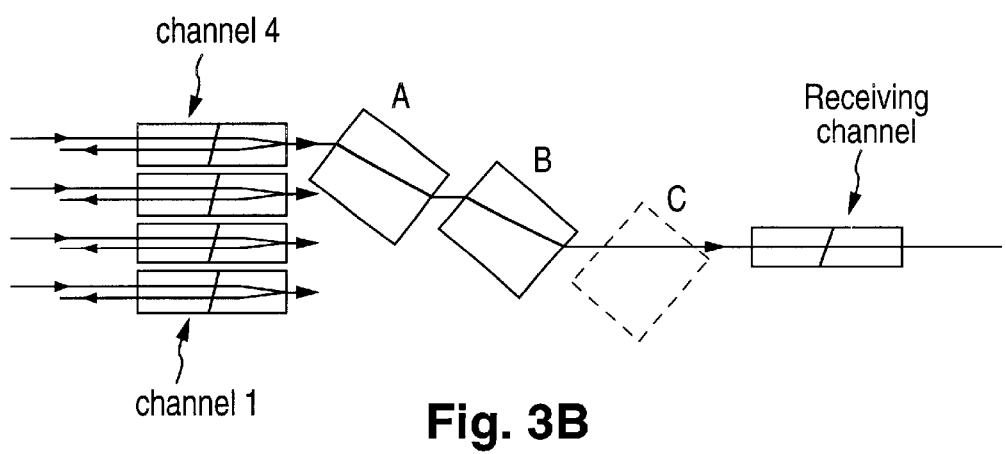
FIG. 3B is a schematic view of a switch with four input channels and a single output channel and prisms between the input and output channels to illustrate another embodiment of the invention.

Other switching mechanisms to direct one of multiple channels to the receiving channel is also within the scope of the present invention. FIG. 3B illustrates a 1×4 switch using prisms to direct the radiation beam. As shown in the drawing, the signal from the channel 4 is directed to the receiving optical fiber by inserting two prisms A and B in the radiation path or channel. Prism C is left out of the radiation path in this connection. Any input channel can be relayed to the receiving fiber by manipulating the positions of the three prisms in the radiation path using a relay, for example. The prisms may be viewed as part of the receiving channel, so that by moving part of the receiving channel, the receiving channel is caused to receive radiation from different input channels.

Figure 4:
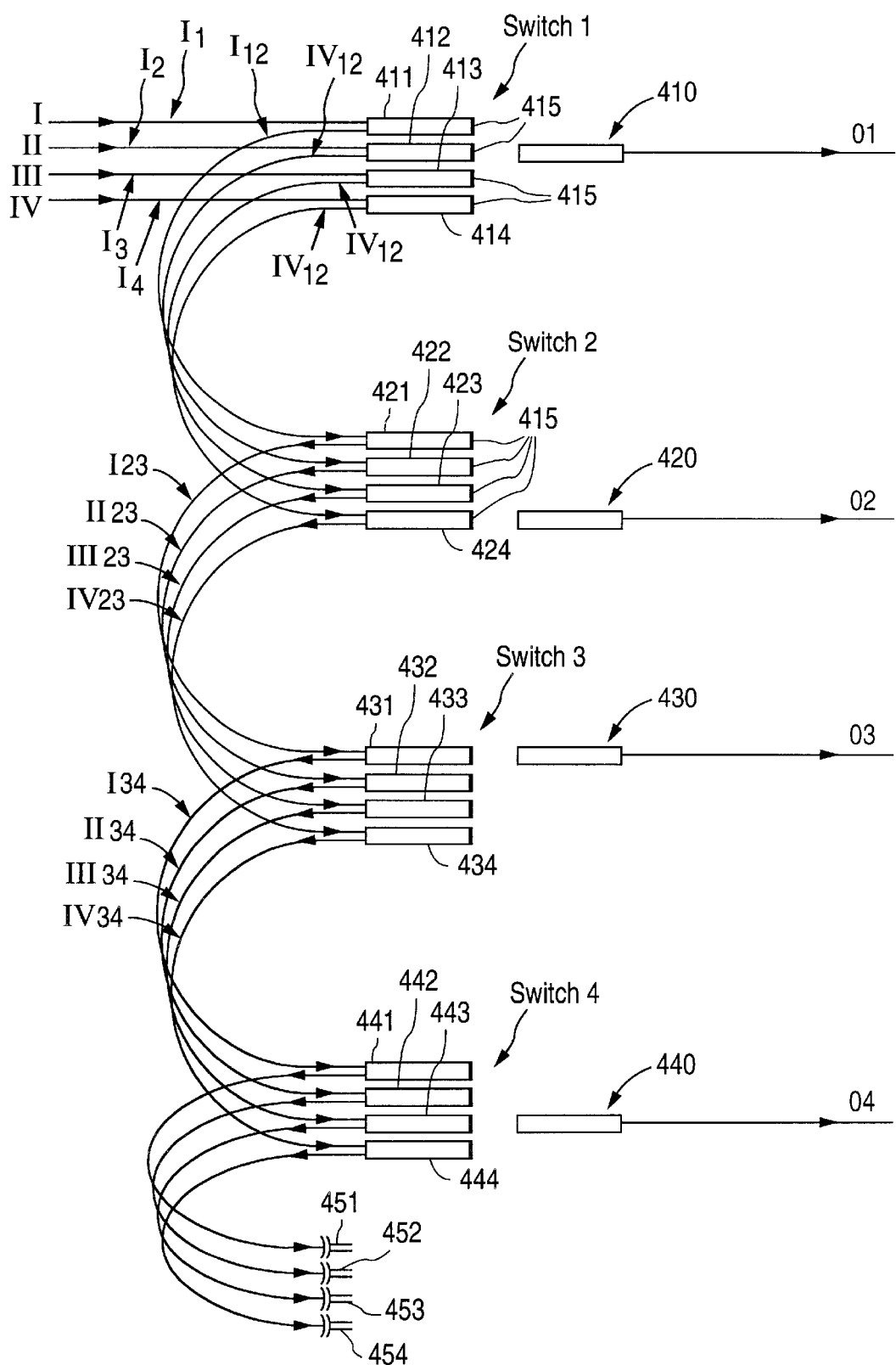
FIG. 4 is a schematic view of a 4×4 distributed matrix switch having four input channels and four output channels employing partially reflective coatings to illustrate yet another embodiment of the invention.

FIG. 4 is to illustrate a 4×4 distributed matrix switch. Four 1×4 switches are used to illustrate the design. Switches of different sizes are also obviously within the scope of the present invention. Switches 1, 2, 3, and 4 are respectively tapped to extract some percentages of the incoming radiation. As shown in FIG. 4, the four switches 1–4 are used to extract and distribute some percentages of the incoming signal, such as the signal carried by the input radiation beam I along an input fiber. Each of the switches includes four collimators, such as collimators 411–414 in switch 1. Each of the collimators 411, 412, 413, 414 comprises a ferrule and GRIN lens, input fiber and output fiber arranged in a manner similar to that of ferrule 27, lens 205 and fibers 201, 201 in FIG. 2A. Coating 415 at the end of the lens in collimator 411 passes a portion of the beam I but reflects a portion thereof To extract and distribute some percentages of the incoming signal, such as the signal carried by the input radiation beam I, a radiation path comprising, for example, an optical fiber I12 is used to convey the portion of the radiation that is reflected by the coating 415 at the end of the GRIN lens in the collimator 411 of switch 1 to the collimator 421, where the conveyed signal forms the input signal to collimator 421 of switch 2. The optical coating 415 of collimator 421 passes a portion of such input beam conveyed by fiber I12 but reflects a portion thereof towards another fiber I23 which serves as a radiation path to convey such reflected portion towards another switch 431 of similar construction. Switch channel 431 in turn passes a portion of the incoming beam conveyed by fiber I23 and reflects a portion of such beam towards another fiber I34 which conveys the reflected portion to the collimator 441 of switch 4 which again passes a portion thereof and reflects a portion thereof towards a detector 454. Thus, the collimators 411, 421, 431, 441 in the four switches are used to pass and tap off selected percentages or wavelength components of the incoming radiation beam 1. The coatings 415 employed in such collimators may be designed to pass a predetermined portion of an incoming radiation beam and reflect the remainder. Similarly, collimators 412, 422, 432, 442 of the four switches are used to perform similar functions for passing selected percentages or wavelength components of the signal in the radiation beam II. The same is true for the set of collimators 413, 423, 433, 443 and the set of collimators 414, 424, 434, 444 for the signals in their respective radiation beams III and IV.

Thus as can be seen from FIG. 4, four sets or clusters of optical components are provided, that is, the four sets or clusters of collimators in switches 1–4. Each set of such components includes four components, where each component includes an optical coating that reflects a first portion of a corresponding input beam of radiation and passes a second portion of the input beam. In order to convey the reflected portions from these coatings, four groups (I12, I23, I34; II12, II23, II34; III12, III23, III34 and IV12, IV23, IV34) of optical paths are provided, each group including three paths for connecting the four components of the corresponding set of components. Thus, the optical fiber III12 connects the collimators 413, 423; the optical fiber III23 connects the collimators 423, 433 and the optical III34 connects the collimators 433, 443, Four receiving channels (410, 420, 430 and 440) are provided for receiving the second portion of an input beam passed by one of the components in the four sets of components. The four receiving optical fibers 01, 02, 03, 04 may be moved so that each of the fibers is caused to receive the second portion of the input beam passed by one of the four collimators of a corresponding switch.

In reference to FIG. 4, if the four input signals I through IV are to be switched only between three output channels instead of four, then only three switches will be needed, where each switch still includes 4 collimators. These collimators are then arranged in three clusters of four components each so that each cluster includes one component from each of the four sets, each cluster corresponding to a receiving channel. Thus, the cluster for switch 1 corresponds to the receiving fiber 410. Each of the three receiving channels is moved by a moving means such as a motor to receive the input beam that is passed by the selected one of the four components in the corresponding cluster.

In general, n sets of optical components (such as collimators) may be provided for switching signals from n radiation paths to m receiving channels. The m*n components are arranged in m clusters of n components each so that each cluster includes one component from each of the n sets, where n and m are positive integers that may or may not be equal. Each cluster corresponds to a receiving channel. A total of n groups of optical paths are then provided, each group including (m−1) paths for connecting the m components of a corresponding set of components. For the (m−1) paths for connecting the m components distributed in the m groups for distributing the radiation from one of the input beams to m receiving channels, each path connects the ith component to the (i+1)th component in the corresponding set, i ranging from i to (m−1), so that radiation passed by the ith component becomes the input beam to the i+1 component. Receiving means is provided which includes in n receiving channels, each channel for receiving the second portion of an input beam passed by one of the components in the n sets of components. The receiving means includes means for causing the receiving channels to receive the second portion of the input beam passed by a selected on of the plurality of components. In the preferred embodiment, each of the m receiving channels is moved by a moving means such as a motor to receive the second portion of the input beam passed by a selected one of the plurality of n components in the corresponding cluster.

As an option, at the end of the power daisy chain a small amount of reflection from the switch 4 is delivered to detectors 451–454 to serve for the signal monitoring.

410, 420, 430 and 440 are the common ports for switches 1–4, respectively. The common port of its switch can be freely directed to any of input ports of the switch. FIG. 3 is used to illustrate the concept of switching. The switching can be achieved by moving the common fiber as indicated in U.S. Pat. Nos. 4,896,935 and 5,317,659 or by moving optical elements such as one or more prisms between the input and output ports as depicted in Pages 47–50 of the 1998 Product Catalog of DiCon Fiberoptics, Inc., Berkeley, Calif.

The reflectivity in each switch is determined by the designed loss at each output. The design loss of the coating can be controlled in a manner known to those skilled in the art to achieve any percentage of light to be passed. If the input signals I1–I4 are designed to be substantially equally distributed to the output ports O1–O4, it is obvious that the reflectivity of the switches is decreased from switch 1 to switch 4.

Figure 5:
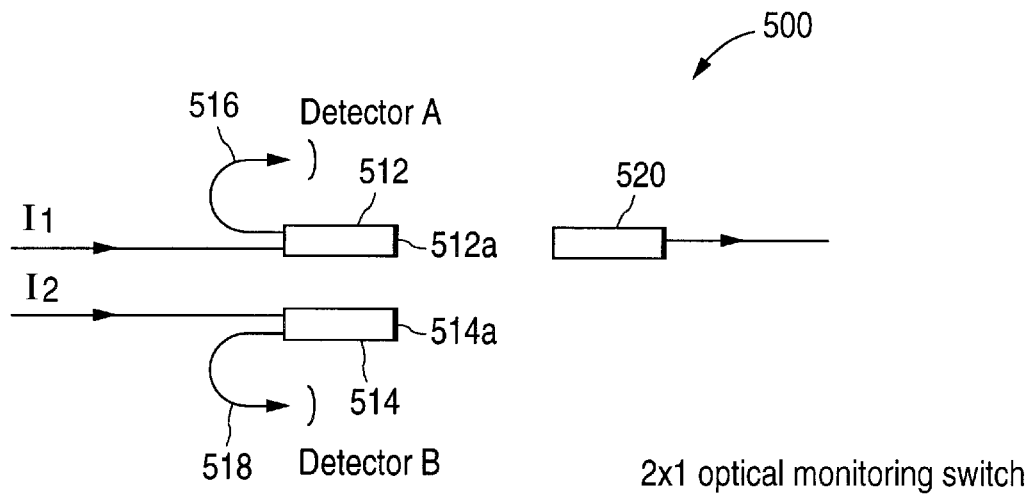
FIG. 5 is a schematic view of a switch with two input channels and a single output channel and two monitoring detectors to illustrate one more embodiment of the invention.

FIG. 5 is a schematic view of a 2×1 optical monitoring switch 500. Switch 500 includes two collimators, a collimator 512 having a coating that is reflective or functions as a wavelength selective filter 512a and a collimator 514 having a coating that is reflective or functions as a wavelength selective filter 514a. An optical path 516 conveys the portion of the radiation from an input beam I1 that is reflected by coating 512a to a detector A for monitoring purposes. Similarly, optical path 518 conveys the radiation reflected by coating 514a to a detector B for similar purposes. The receiving channel 520 is moved to selectively receive the radiation passed by coating 512a or that passed by coating 514a to form a 2×1 optical monitoring switch.

Figure 6:
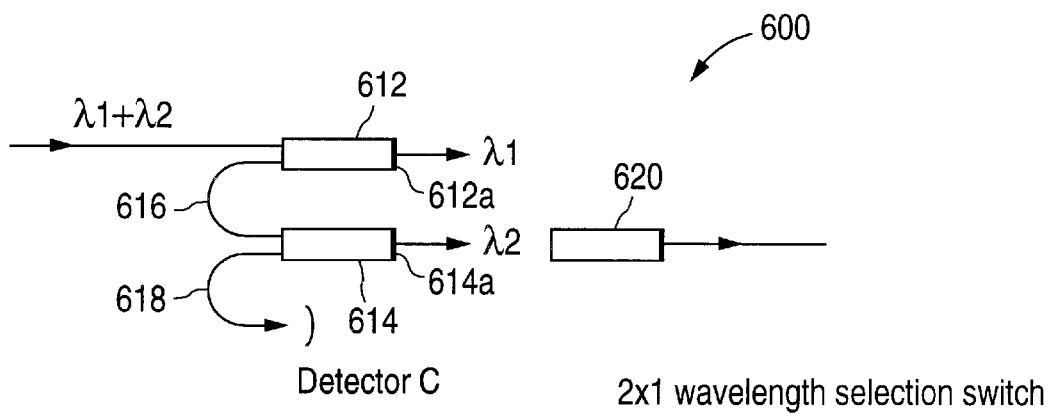
FIG. 6 is a schematic view of a switch with a single input channel carrying an input beam having two wavelength components, a single output channel and a monitoring detector to illustrate still one more embodiment of the invention.

FIG. 6 is a schematic view of a 2×1 wavelength selection switch 600 having two collimators 612 and 614. Collimator 612 includes a wavelength selective filter 612a and collimator 614 includes a wavelength selective filter 514a. Even though the two filters are shown to be contiguous with the GRIN lens portions of the two collimators, it will be understood that this is not required and that the wavelength selective filters may be spaced apart from the GRIN lenses without losing the advantages of the invention.

As shown in FIG. 6, the input radiation to switch 600 has wavelength components $\lambda 1$ and $\lambda 2$. Filter 612a has a pass-band that passes wavelength component at $\lambda 1$, but reflects the wavelength component at $\lambda 2$ from the incoming radiation. The radiation that is reflected by coating 612a is conveyed by fiber 616 to collimator 614, where upon such wavelength component is passed by coating 614a having a pass band that will pass the wavelength component at $\lambda 2$. Another optical path 618 conveys any radiation that is reflected by coating 614a to a detector C for monitoring purposes. Receiving channel 620 may be moved to the appropriate position to receive the wavelength component at $\lambda 1$ that is passed by coating 612a or the wavelength component at $\lambda 2$ passed by coating 614a. Obviously, the incoming radiation may include more than two wavelength components and more than two collimators with wavelength selective filters having three different pass bands may be used so that the more than two wavelength components will be passed by the more than two collimators with wavelength selective filters that have different pass bands. Such and other variations are within the scope of the invention.

Figure 7:
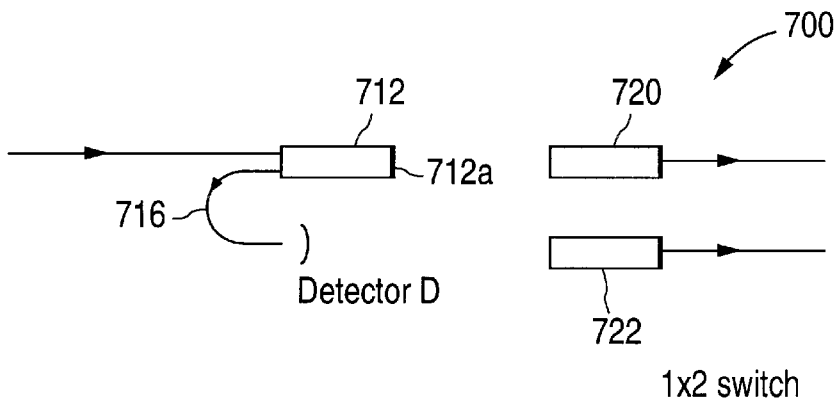
FIG. 7 is a schematic view of a switch having one input channel and two output channels and a monitoring detector to illustrate yet another embodiment of the invention.

FIG. 7 is a schematic view of a 2×1 switch to illustrate another aspect of the invention. In the embodiments of FIGS. 3–6, more than one collimator is used. This is, however, not required as illustrated in switch 700 of FIG. 7, where a single collimator 712 is employed, having a coating 712a that passes a portion of the incoming radiation and reflects the remainder towards an optical path 716 to a detector D for monitoring purposes. Two receiving channels 720 and 722 are employed. Relative motion may be caused between collimator 712 on one hand and receiving channel 720 and/or 722 on the other so that one of the two receiving channels receives radiation passed by collimator 712. Obviously, more than two receiving channels may be employed, so that in general, a 1×m switch may be constructed where m can be any positive integer. Thus, in general, a switch is proposed including more than one optical component or more than one receiving channel, so that the switch switches between a plurality of input beams and at least one receiving channel, or between the at least one input beam and more than one receiving channel.

While the invention has been described above by reference to various embodiments, it will be understood that changes and modifications may be made without departing from the scope of the invention, which is to be defined only by the appended claims and their equivalents.

What is claimed is:

1. A switch that switches between a plurality of input beams and at least one receiving channel comprising:

one or more optical components, each component including an optical coating that reflects a first portion of a corresponding input beam of radiation and passes a second portion of the input beam; and one or more optical paths connecting the plurality of input beams to one or more of the receiving channels; and at least one receiving channel that receives the second portion of an input beam passed along one of the optical path(s) by one of the one or more optical components; and a device that moves the optical path(s) to selectively convey the first or second portion of one of the plurality of input beams to the at least one receiving channel, wherein at least one of the input beams is not conveyed to the at least one receiving channel.

2. The switch of claim 1, wherein the at least one component includes a GRIN lens that collimates radiation from a corresponding input beam to the optical coating of such component.

3. The switch of claim 1, said switch comprising a plurality of optical components, said switch further comprising a plurality of optical paths, each path connecting a pair of the plurality of components, to convey the first portion of an input beam reflected by the coating in one of the pair of components to the coating of the other of the pair of components so that such conveyed first portion is the input beam to the other of the pair of components.

4. The switch of claim 3, wherein the plurality of components are arranged in an array, each of said optical paths connecting a pair of adjacent components, to convey the first portion of an input beam reflected by the coating in one of the pair of adjacent components to the coating of the other of the pair of adjacent components so that such conveyed first portion is the input beam to the other of the pair of adjacent components.

5. The switch of claim 1, said optical path(s) including a refractive element, said device moving the refractive element to cause the at least one receiving channel to receive the first or second portion of the input beam passed by the at least one component.

6. The switch of claim 5, said at least one receiving channel including at least one fiberoptic element, said device and optical path(s) moving said at least one element to cause the at least one receiving channel to receive the first or second portion of the input beam passed by the at least one component.

7. The switch of claim 1, further comprising at least one optical path for conveying the first portion of the input beam to a detector for monitoring the switch.

8. The switch of claim 1, said switch being a m by n switch for switching n input beams to m receiving channels, m, n being positive integers.

9. The switch of claim 8, wherein n or m is one.

10. The switch of claim 1, said switch comprising a plurality of optical components, each component having, a coating forming a wavelength selective filter which reflects a first portion of a corresponding input beam of radiation at wave lengths within a first wavelength band and passes a second portion of the input beam within a second wavelength band different from the first wavelength band and defining a pass band of such filter.

11. The switch of claim 10, wherein the pass bands of at least two of the wavelength selective filters are different.

12. The switch of claim 10, wherein for at least two of said filters, an input wavelength component that is reflected by one of said at least two filters passes the other of said at least two filters.

13. A distributed matrix switch comprising:

n sets of optical components, each set including m components, n, m being positive integers, each component including an optical coating that reflects a first portion of a corresponding input beam of radiation and passes a second portion of the input beam;

n groups of optical paths, each group including (m−1) paths for connecting the m components of a corresponding set of components, each path connecting the ith component to the (i+1)th component in the corresponding set, i ranging from 1 to (m−1), so that radiation passed by the ith component becomes the input beam to the (i+1)th component; and a receiving element including m receiving channels, each channel for receiving the first or second portion of an input beam passed by one of the components in the n sets of components;

said receiving element comprising a mechanism moving to cause at least one of the m receiving channels to receive the first or second portion of the input beam passed by a selected one of the plurality of components.

14. The distributed matrix switch of claim 13, wherein the components are arranged in m clusters of n components each so that each cluster includes one component from each of the n sets, each cluster corresponding to a receiving channel, wherein each of the m receiving channels is moved by the mechanism in order to receive the first or second portion of the input beam passed by a selected one of the plurality of n components in the corresponding cluster.

15. The switch of claim 13, at least one of said receiving channels including at least one refractive element, said mechanism moving said element to cause the at least one receiving channel to receive the first or second portion of the input beam passed by the selected one of the components in the n sets of components.

16. The switch of claim 13, at least one of said receiving channel including at least one fiberoptic element, said mechanism moving said element to cause the receiving channel to receive the first or second portion of the input beam passed by the selected one of the components in the n sets of components.

17. The switch of claim 13, further comprising n input paths supplying n input beams of radiation to the first set of components.

18. The switch of claim 13, further comprising n monitoring paths conveying the first portions of radiation beams reflected by the components in the nth set of components to n detectors for monitoring switch performance.

19. The switch of claim 13, said switch comprising a plurality of optical components, each component including a wavelength selective filter that reflects a first portion of a corresponding input beam of radiation at wavelengths within a first wavelength band and passes a second portion of the input beam within a second wavelength band different from the first wavelength band.

20. The switch of claim 19, said switch comprising a plurality of optical components, each component including a wavelength selective filter that reflects a first portion of a corresponding input beam of radiation at wavelengths within a first wavelength band and passes a second portion of the input beam within a second wavelength band different from the first wavelength band and defining a pass band of such filter.

21. The switch of claim 19, wherein the pass bands of the filters of at least two of the components are different.

22. The switch of claim 19, wherein for the filters of at least two of said components, an input wavelength component that is reflected by one of said at least two filters passes the other of said at least two filters.

* * * * *